(12) United States Patent
Rossi

(10) Patent No.: US 8,518,205 B2
(45) Date of Patent: Aug. 27, 2013

(54) METHOD TO PRODUCE A WOOD-BASED PRODUCT AND PRODUCT THUS OBTAINED

(75) Inventor: Luca Rossi, Trieste (IT)

(73) Assignee: Antonini Legnami SRL, Trieste (IT)

( * ) Notice: Subject to any disclaimer, the term of this patent is extended or adjusted under 35 U.S.C. 154(b) by 0 days.

(21) Appl. No.: 13/127,816

(22) PCT Filed: Nov. 10, 2009

(86) PCT No.: PCT/EP2009/064936
§ 371 (c)(1),
(2), (4) Date: May 25, 2011

(87) PCT Pub. No.: WO2010/052340
PCT Pub. Date: May 14, 2010

(65) Prior Publication Data
US 2011/0236661 A1    Sep. 29, 2011

(30) Foreign Application Priority Data

Nov. 10, 2008   (IT) .............................. UD2008A0235

(51) Int. Cl.
*B32B 21/08*    (2006.01)
*B32B 7/12*     (2006.01)
*B29C 65/48*    (2006.01)

(52) U.S. Cl.
USPC .............. 156/267; 428/98; 428/447; 428/215

(58) Field of Classification Search
USPC .............................. 428/98, 215, 447; 156/267
See application file for complete search history.

(56) References Cited

U.S. PATENT DOCUMENTS 6,201,055 B1 *  3/2001  Lutz et al. ..................... 524/493

FOREIGN PATENT DOCUMENTS

EP           711655 A2 *  5/1996

* cited by examiner

*Primary Examiner* — David Sample
*Assistant Examiner* — Tahseen N Khan
(74) *Attorney, Agent, or Firm* — Jonathan Ball; Greenberg Traurig

(57) ABSTRACT

A method to produce a wood-based product (10) comprises a first step in which, from a trunk (12) of wood, a plurality of sheets of wood (14) are made, a second step in which a stack or pile (15) formed by the sheets (14) disposed one on top of the other is made, and in which, between one sheet (14) and the other, a layer of adhesive material (16) is deposited, along determinate gluing planes (P), a third step in which the stack or pile (15) is subjected to compression for a determinate period of time, so as to allow the reticulation of the adhesive material and to make the sheets (14) adhere permanently to each other, and a fourth step in which the stack or pile (15) is cut along at least a plane transverse to said gluing planes (P), in order to obtain the product (10). In the second step an adhesive with a bi-component silicone base is used.

15 Claims, 5 Drawing Sheets

METHOD TO PRODUCE A WOOD-BASED PRODUCT AND PRODUCT THUS OBTAINED

FIELD OF THE INVENTION

The present invention concerns a method to produce a wood-based product, advantageously flat and/or elongated in shape, and also the product thus obtained.

In particular, the wood-based product according to the present invention is applied in the nautical or marine field, for example to make the walkable surfaces, in particular the decking, of boats (yachts, cruise ships) or other functional parts or furnishings for boats, both inside and outside, particularly where it is necessary to bend the staves in order to follow a curved structure.

Moreover, the wood-based product according to the present invention is also applied to the field of external furnishings, such as gardens, parks, terraces, patios, courtyards, verandas, porticos, to make the relative furnishing elements such as chairs, benches, tables, but also the relative walkable parts or floorings, and to make stairs and handrails intended for outside use. In general, the present invention is preferentially applied to make wood-based products (mixed or of other materials) intended to come into contact, for short or long periods, or definitively, with atmospheric agents, in particular rain and damp, although there is nothing to prevent using the present invention to make wood objects intended for internal use.

Another application of the present invention, whether used inside or outside, is to make wood-based products that have a very big longitudinal extension.

Another application of the invention is to make bearing structures with elastic properties such as to be anti-seismic.

BACKGROUND OF THE INVENTION

It is known to use the wood teak, because it is resistant to water by its very nature, to make wood-based products such as strips or staves, intended for contact with the rain and damp, typically the walkable surfaces of boats, such as decking, or floorings for gardens, parks, terraces, patios, courtyards, verandas, porticos, and the relative furnishing elements such as chairs, tables and benches for outside use.

Other woods that can be used are bangkirai, western red cedar, iroko and others, although hereafter, for convenience of description, we shall refer only to teak.

Teak is normally worked starting from the trunk, to make strips, staves, planks or other bodies of solid wood.

Usually, the trunk is cut in two ways, obtaining different effects of the final cut piece.

A first way is to cut longitudinal pieces, for each cut intersecting the growth rings of the trunk at two points, obtaining the so-called "streaked" or "cathedral" effect (FIG. 1a).

A second way is to cut longitudinal pieces, for each cut intersecting the growth rings of the trunk at a single point, obtaining the so-called "striped" effect (FIG. 1b). The "striped" effect is the one preferred, and the only one accepted, in applications for the nautical or marine sector, especially for the decks of boats. This is not only due to aesthetic reasons but also because, typically, the "streaked" strip is wider, due to the cut by which it is obtained, and this entails that it has a greater tendency to bend centrally ("warping") and to absorb more damp, and thus to have greater variations in size, even 5%, as it moves, widens and is tensed over the whole walkable surface. On the contrary, strips with the "striped" effect are not excessively subject to central flexions and do not "warp", and have a lesser tendency to move and widen, usually about 2%.

Usually, from a trunk of teak, the yield of solid wood usable is very low, especially if "striped" effect pieces are made. This is because, although the trunks can reach up to 20 meters in height, the usable part, considering the zones with defects in the external rings and the region with branches, is 3 to 4 meters long at most. It must be remembered that these heights and peculiarities are obtained mainly in trunks from natural tropical forests. In fact there are also plantations certified by the FSC (Forest Stewardship Council) for an environmentally-sustainable use of teak; however, these plantations do not supply trunks with the best properties like the tropical plantations, and have an even lower yield, sometimes even zero for application in specific sectors such as the nautical sector.

On the other hand, it is clear that it would be preferable, both from a purely ecological point of view, and also for an ecology-based commercial approach, to use and propose wood-based products deriving from FSC plantations.

Methods are also known, based on the reassembled wood technique, which allow to make wood based and resin laminated products, for example described in EP-A-0.711.655 (EP'655), GB-A-2.236.708, EP-A-0.791.612 and U.S. Pat. No. 5,143,537 and which provide to make sheets of wood, for example using the known rotary cut technique applied to the trunk, or by a transverse cut of the trunk with suitable blades.

In these techniques, the sheets of wood are positioned one on top of the other to form a pile, with the binding resin interposed between one sheet and the other. The resin used is melamine-based or with a melamine base modified with acrylic resin, and in any case they are normally glues used for interiors. The pile of sheets of wood with the binding resin is heat-compressed, with a pressure between 20 and 60 kg/cm$^2$, for the time needed to activate the polymerization of the resin, thus obtaining the desired laminated product.

The laminated product is then once again cut transversely with respect to the gluing lines, obtaining planks, or at least bodies, on which the so-called "striped" effect is reproduced.

The yield of the final product from the trunk using the techniques described above is much higher, even if trunks from FSC plantations are used.

However, the products obtained using the reassembled wood technique as described above, which normally uses glues for interiors, are very rigid, with low flexibility and no torsional capacity, and are therefore unsuitable for applications where such properties are very important and requested, such as for example in the nautical field, in particular for making decks for boats which, as is known, are shaped curved in suitable regions so as to conform to the geometry of the boat itself and must resist the atmospheric agents. This is because the glue used, for example in EP'655, is a melamine resin, or modified with acrylic resin, and very rigid, and therefore confers excessive rigidity on the final product. Moreover, the thicknesses of the laminates used in EP'655, from 5.5-10 mm, 6-10 mm or 7.5-10 mm, are very high, thus causing excessive rigidity of the final product which in practice prevents it from being used for the above purposes and functions.

Furthermore, known products have the disadvantage that the melamine based resin used, or in any case the glue for interiors, quickly deteriorates under the action of the UV solar rays and does not resist against atmospheric agents.

One purpose of the present invention is to perfect a method to produce a wood-based product, and to achieve a relative wood-based product, which has good elasticity, in particular good torsional and flexional capacity.

Another purpose is to produce a wood-based product that does not deteriorate under the action of the UV solar rays.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a method to produce a wood-based product comprises:

a first step in which a plurality of sheets of wood are obtained from a trunk of wood;

a second step in which a stack or pile is made, formed by the sheets disposed one above the other and in which, between one sheet and the other, a layer of adhesive material is deposited along determinate gluing planes;

a third step in which the stack or pile is subjected to compression for a determinate period of time, so as to allow the reticulation of the adhesive material and make the sheets adhere to each other in a stable or permanent way; and a fourth step in which the stack or pile is cut, along at least a plane transverse to said gluing planes, so as to obtain the product, typically with the so-called "striped" effect.

According to a characteristic feature of the present invention, in the course of the second step an elastomer adhesive is used as adhesive material, with a bi-component silicone base.

Advantageously, the thickness of each of the individual sheets cut is less than 3 mm, preferably less than about 2.6 mm, more preferably still comprised between about 2.6 mm and 1.5 mm.

Thanks to the specific glue used, advantageously in combination with the reduced thicknesses involved, a good elastic capacity of the final product is obtained, particularly in flexion and torsion, totally new with respect to the products known in the state of the art. In fact, the glues traditionally used in this specific sector are of the "static" type and crystallize, giving a great rigidity to the final product.

This allows to shape the wood-based product obtained as desired, for example a strip or multi-layer stave, in order to adapt it to the various geometries and pre-existing structures with which it is to be associated. This is particularly advantageous in making the walkable surfaces of boats, where there are curved regions, for example in correspondence with the bow and/or the stern, where the wood-based product according to the present invention can be deformed and curved in a totally new and unexpected way compared with a solid wood product or reassembled products obtained according to the state of the art. This is an advantage that also involves the possibility of making furnishing elements or other products according to the invention, with the desired shapes and forms, that cannot be obtained with known techniques.

The use of the glue according to the present invention is advantageous since it offers high resistance to UV solar radiation, and therefore its properties do not deteriorate over time and the life of the final product is prolonged.

Another advantage of the invention is that a final product is obtained that allows to make strips for floorings (decks of ships, terraces or other) with widths of up to 200-250 mm, which cannot be made with the known techniques, both because wide "streaked" strips tend to bend and to absorb damp, and also because strips with the "striped" effect, because of how they are normally made, cannot reach such widths.

Despite the possible great widths as above, strips made according to the present invention do not show any tendency to warp, and absorb little damp, thus allowing a great stability of size, especially when installed in floorings and as covering for walkable surfaces in general.

In order to be able to achieve even very great lengths, the method according to the present invention advantageously provides to effect, between the first and second step, the head-wise joining of one sheet and the other, using said adhesive material.

According to one solution of the invention, the join is made in correspondence with relative edges, advantageously inclined, in particular with a relative inclination comprised between about 40° and 50°, for example about 45°, of adjacent and juxtaposed sheets lying on the same plane, or with another type of join, such as a finger-type join. Subsequently, in the course of the third step, the sheets so joined are piled one on top of the other so that the corresponding joined edges are offset laterally along the thickness of the pile or stack that is made. In other words, with reference to a determinate position in the pile, we shall have, alternated along the thickness of the pile, sheets that, in the determinate position, have inclined edges joined head-wise and sheets that do not have any joined edges. Afterwards, the compression and cutting as described above are carried out. This head-wise joining technique allows an even greater capacity for flexion and torsion without incurring breakages in correspondence with the surfaces that are joined.

With the method according to the present invention therefore, there is no longer any limit to the size of the initial trunk in order to obtain strips or other oblong elements with the desired length (theoretically tens of meters) and width, even very great, since by making the join head-wise between one oblong element and the other, always using the glue according to the invention, it is possible to multiply the basic length while keeping practically unchanged the mechanical and elastic properties, torsion and flexion, of the final element.

Moreover, the yield from the trunk, with the method according to the present invention, is greatly increased, by up to 80%-90%, also allowing to use trunks from FSC plantations, even if these have limited diameters and lengths, with evident advantages from the ecological point of view.

In this way the final cost of the product obtained is also competitive compared with products known on the market.

A wood-based product also comes within the field of the present invention, formed by a plurality of layers of wood, attached to each other reciprocally by means of relative layers of adhesive material, in which the adhesive material is an adhesive with a bi-component silicone base. The thickness of the individual sheets, less than 3 mm, together with the innovative glue used, allows to have great elasticity (torsional and flexional) of the final product.

The layers of wood are disposed on parallel planes with respect to each other, at intervals and constrained by the layers of adhesive material so as to define a "striped" effect.

A walkable surface, decking or liner also comes within the field of the present invention, made using a plurality of products as described above.

Moreover, the spirit of the present invention also covers the use of a product, or several products, as described above, in order to make decking, liners and/or walkable surfaces in the nautical field.

Advantageously, if suitable flame retardant agents are added to the glue, the density of the layers of glue, for example about every 2 mm, allows to obtain a final product that respects even the strictest fire-prevention regulations.

The present invention, by virtue of its properties of elastic flexibility, unheard of in solid wood elements commonly used or in reassembled products known in the state of the art, is also advantageously applied for making structures, in particular in the building trade, with anti-seismic elastic/flexible properties.

Furthermore, thanks to the natural properties of elastomers and in particular of bi-component silicone used, the present invention is highly resistant to fire.

Moreover, the product obtainable with the present invention, if the surface is wet, has a high friction coefficient, much higher than the limit required by the specific regulations for this field.

Other advantageous applications of the invention, which exploit its great flexibility and elasticity, also torsional, are particularly for making back-rests, but also the seat parts, of seating elements such as seats, chairs, armchairs, deck chairs and suchlike, or for making arches and door/window elements, also with a wide span.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

With reference to the attached drawings, a method according to the present invention is used to make wood-based products, in particular a strip or stave, indicated by the reference number 10, taking as a base the known technique of reassembled wood. In this case, we shall refer to teak, although it is possible to use other woods resistant to water or damp, such as bangkirai, west red cedar, iroko or others.

Figure 1A:
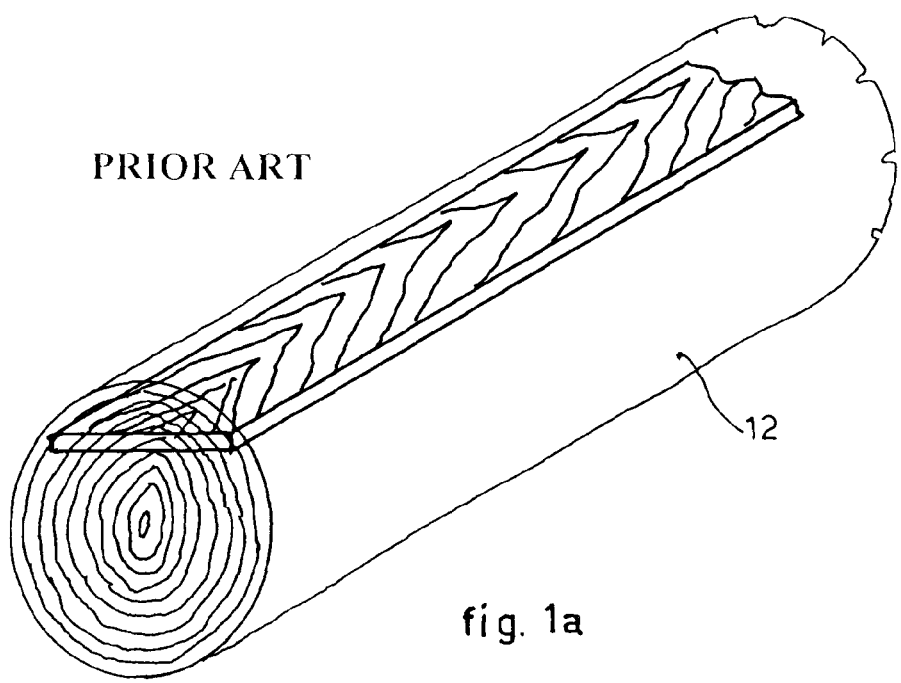
FIGS. 1a and 1b are schematic views showing, respectively, the obtaining of "streaked" strips and strips with the "striped" effect obtained from trunks according to the state of the art.
Figure 1B:
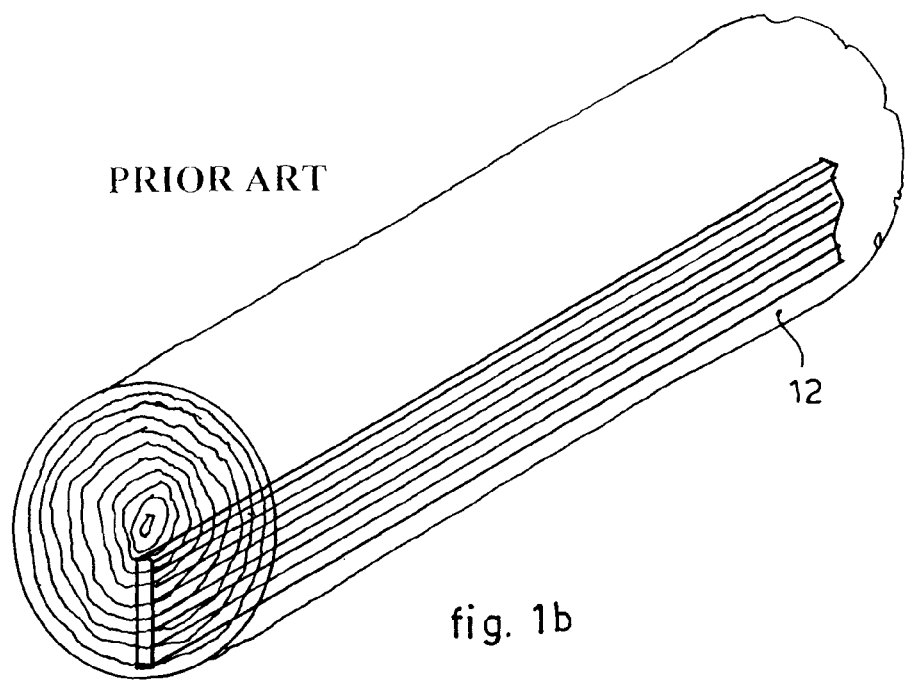
Figure 2:
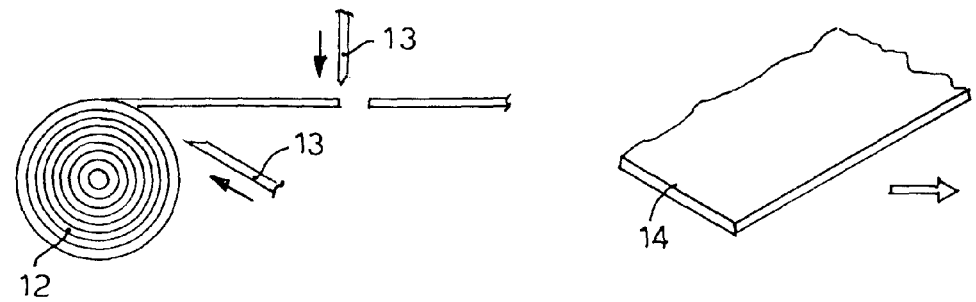
FIG. 2 is a schematic representation of the method according to the present invention.
Figure 2:
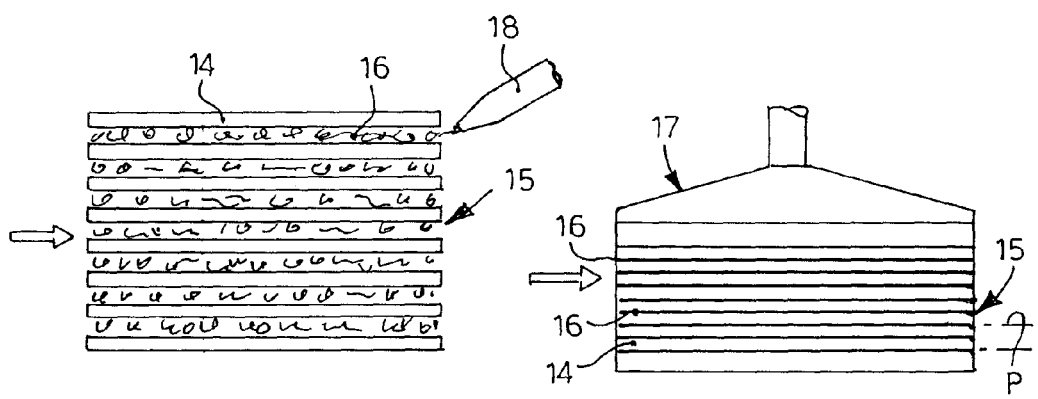
Figure 2:
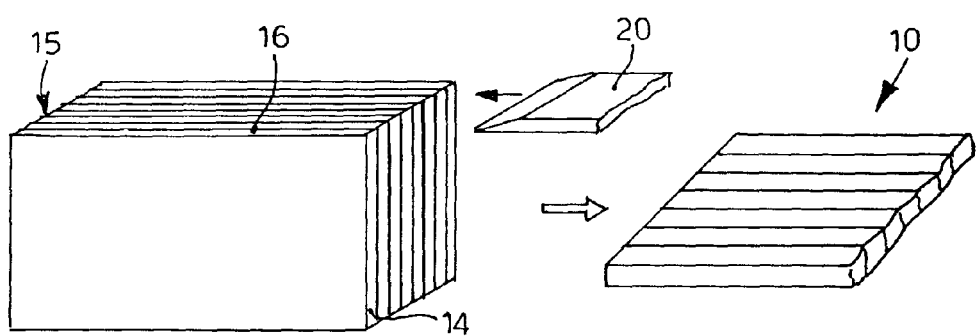

A first step of the method according to the present invention, shown schematically in FIG. 2, provides to make a plurality of sheets 14 of wood of a desired thickness, starting from a trunk 12 of wood, advantageously natural wood, in this case teak.

The step can be performed by applying the known technique of "rotary cut", as indicated only schematically in FIG. 2, by means of suitable cutting members 13 that make the cut tangentially along the growth rings.

Alternatively, according to another technique, the transverse cut can be made along the length of the trunk 12, to obtain longitudinal blades, the so-called slices of wood.

The rotary cut technique allows to obtain sheets of wood with the desired length and section, and with a greater "softness" than what can be obtained with the transverse cut technique.

The sheets 14, obtained using one technique or the other, are assembled one on top of the other in a stack or pile 15 and a layer of glue 16 is deposited between one sheet and the other, by means of a suitable deposit member 18.

The glue used according to the present invention is an elastomer adhesive, with a bi-component silicone base. Each component used is a determinate polymer of loaded silicone.

Subsequently, the pile 15 is subjected to compression by a press 17, for a time suitable to allow the polymerization reaction, or reticulation, of the glue and to obtain the desired adhesion of the sheets 14 and hence their stable connection.

The glue with the bi-component silicone base used, typically with the consistency of a glue or paste (viscosity of one component for example about 1200 Pa*s, viscosity of the other component for example about 110 Pa*s), has a high polymerization speed and the start of the reaction occurs immediately after having mixed the two components. The polymerization mechanism, or reticulation, is based on polycondensation and the polymerization is of the alkoxy type.

The glue used has great properties of mechanical resistance and adhesion, obtainable in a short time, also depending on the operating temperature.

The temperature at which the bi-component silicone base glue is applied is comprised between about 5° C. and 40° C.

Moreover, the bi-component silicone base glue used has great resistance to UV solar rays and to atmospheric agents in general.

The glue used also remains flexible within a wide range of temperature.

Advantageously, flame retardant agents can be added to the bi-component silicone base glue used, thus complying with the legal norms, even the most restrictive ones.

In some embodiments of the present invention, the bi-component silicone is formed by two components, of which a first component A has an approximate density comprised between 1.40 and 1.50 kg/l and a second component B has an approximate density comprised between 1.00 and 1.10 kg/l.

In some embodiments of the present invention, the first component A has an approximate viscosity comprised between 1100 Pa*s and 1300 Pa*s, and the second component B has an approximate viscosity comprised between 100 Pa*s and 120 Pa*s.

In some embodiments of the present invention, the mixing ratio A:B between first component A and second component B is comprised between 10:1 and 15:1, preferably between 12:1 and 14:1.

In some embodiments of the present invention, the bi-component silicone used, understood as the mixture of the first component A and the second component B, has a density (the so-called mixed density) comprised between 1.20 kg/l and 1.48 kg/l, preferentially between 1.30 kg/l and 1.45 kg/l.

In some embodiments of the present invention, the bi-component silicone used, understood as the mixture of the first component A and the second component B, has a Shore hardness A comprised between 40 and 50.

In some embodiments of the present invention, the bi-component silicone used, understood as the mixture of the first component A and the second component B, has an elongation at breaking point comprised between 220% and 260%.

In some embodiments of the present invention, the bi-component silicone used, understood as the mixture of the first component A and the second component B, has a resistance to traction comprised between $2N/mm^2$ and $2.5N/mm^2$.

According to an advantageous form of the present invention, the bi-component silicone used is based on a product available on the market under the name of Sikasil® WT-485, formed by the component Sikasil® WT-485 A (first component) and by the component Sikasil® WT-485 B (second component).

Sikasil® WT-485 is a quick-setting bi-component adhesive that sets with properties of mechanical resistance and adherence, within a short period of time, which:

has optimum adhesion to most substrates (glass, metal, wood and PVC);

has exceptional resistance to atmospheric agents;

maintains its flexibility at a wide range of temperatures;

is long lasting.

Applicant has found experimentally that the preferred range of temperatures inside the aforesaid range of application of the bi-component silicone based glue is comprised between about 20° C. and 30° C., preferably between about 20° C. and 25° C., where we have the optimum compromise between productivity, hence speed of polymerization and adhesive effect, characteristics of the wood used for the sheets to be glued, and final characteristics desired in terms of mechanical resistance and, in particular, elasticity (flexional and torsional). Before applying the layer of glue 16, there may be a calibration step, cleaning, drying and the removal of oil, grease or powder.

The pile 15 thus obtained, formed by a plurality of sheets 14 glued to each other by the alternating layers of glue 16, so-called "glue lines" that are disposed along gluing planes P, typically all parallel to each other, is subjected to the desired workings so as to obtain the final strip 10.

In particular, as shown schematically in FIG. 2, the pile 15 can be cut transversely to said glue lines, or transversely to the corresponding gluing planes P, so as to obtain the "striped" effect on the final strip 10, using another suitable cutting member 20 (FIG. 2).

For example, the pile 15 is rotated by 90° with respect to its position during compression, in which the sheets 14 are horizontal and located one on top of the other, so that the sheets are disposed vertical and adjacent to each other and the gluing planes P are also vertical and the pile 15 is then subjected to a cutting action with the cutting member 20 acting along a substantially horizontal plane.

The thickness of the sheets 14 usable for the present invention is less than about 3 mm, preferably less than about 2.6 mm, advantageously comprised between about 2.6 mm and 1.5 mm, thus obtaining a great elasticity and flexibility of the final product.

Figure 3:
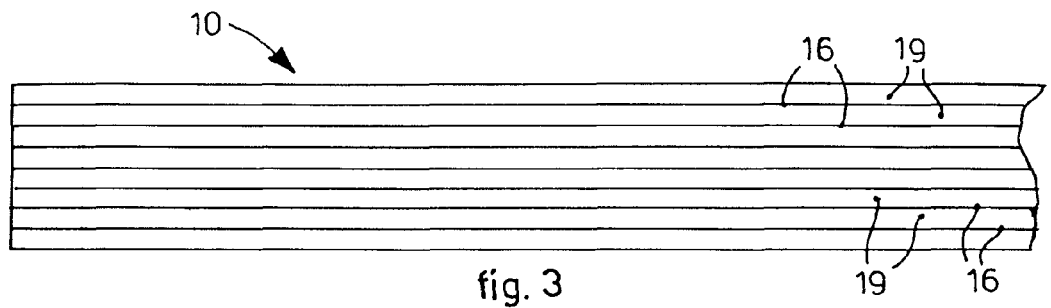
FIG. 3 is a plan view from above of a wood-based product according to the present invention.

In this way we obtain, as shown in FIG. 3, a strip 10 formed by layers of wood 19, typically parallel to each other, with a thickness as described above, alternating with layers of glue 16 that are disposed along the gluing plane P.

Thicknesses greater than about 3 mm give a final product that is not very elastic, or not at all elastic, whereas smaller thicknesses, although they have a good effect on the elasticity, do not render the whole economical, considering the cost of the layer of glue to be laid between the sheets.

Figure 4A:
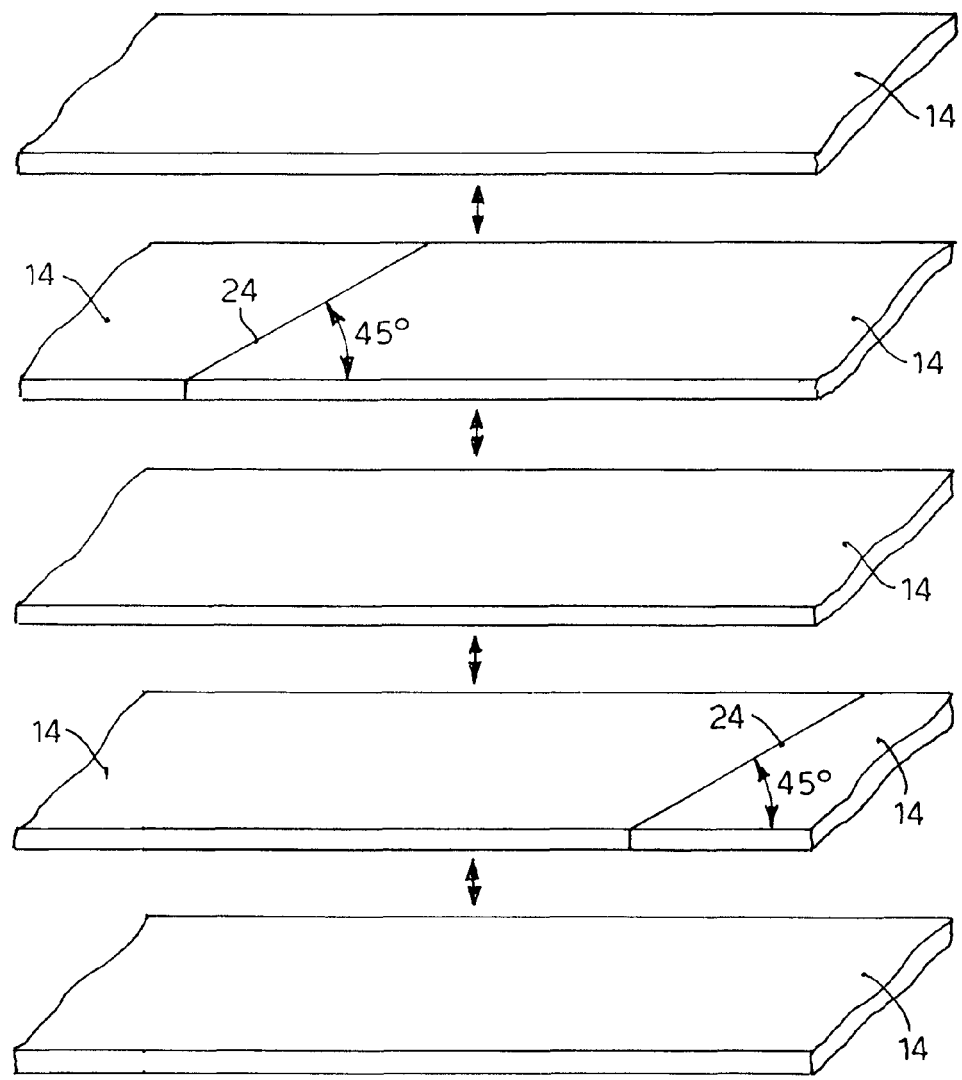
FIGS. 4a, 4b and 4c are schematic representations of sequential steps to achieve a head-wise join of wood-based products according to the present invention.
Figure 4B:
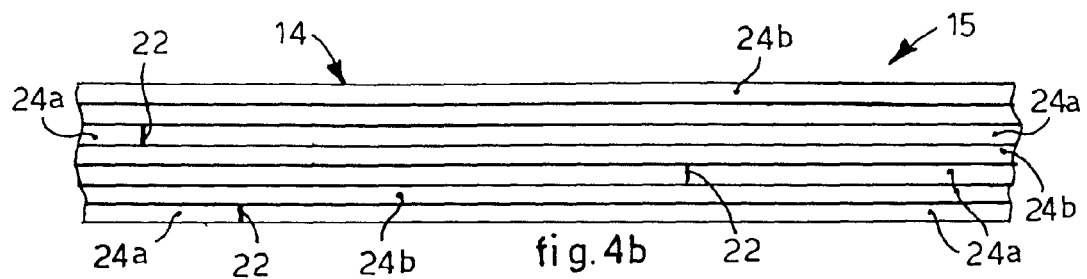
Figure 4C:
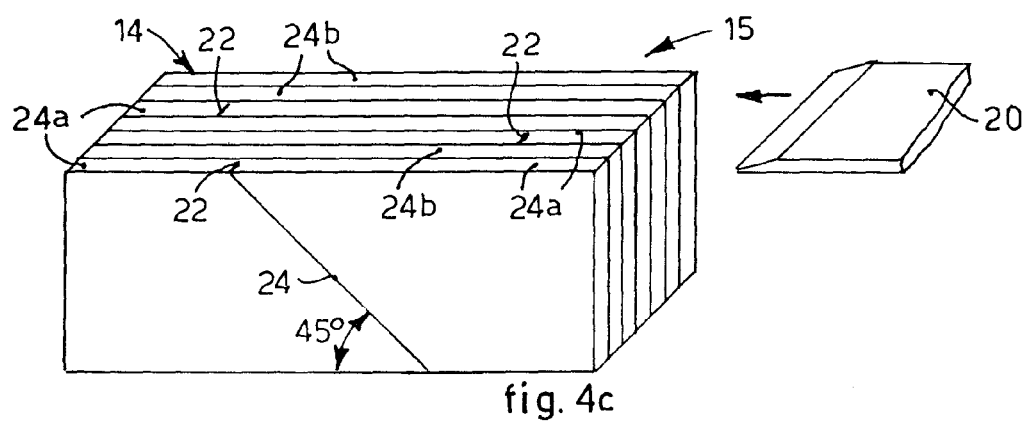

In particular, if we want to obtain strips, staves or planks with a greater length than that obtainable simply by cutting the pile 15 transversely, it will be possible, before forming the pile 15, to join head-wise several sheets 14 on the same plane, along respective edges 24, both leading edges and tail edges, shaped inclined in a mating manner, such as for example a join with a relative inclination comprised between about 40° and 50°, for example about 45°, always using the glue indicated above, as can be clearly seen in FIGS. 4a, 4b and 4c, where the join line is indicated by the reference number 22.

Subsequently, the sheets 14 joined head-wise are disposed one on top of the other, to form the pile 15, in an offset fashion, so that the join lines 22 are offset laterally along the thickness of the pile 15, as can be seen in FIGS. 4a and 4b. Afterwards there will be the step of compression and cutting, already shown, FIG. 4c.

In other words, with reference to a determinate position of the pile 15, an alternating disposition is obtained, along the thickness of the pile 15, of segments of sheets 24a that have a join line at 45° and segments of sheets 24b that do not have join lines. We thus have the advantage of a homogeneous distribution, not at single different points, of the join lines 22 along the surface of the pile 15 (FIG. 4c) and therefore of the final strip 10, instead of obtaining a continuous join line that passes through the pile 15 and hence the final strip 10, in a determinate position.

Applicant has found that the inclination of the edges 24 of 45° is particularly advantageous, with respect to a shaping at 90°, because it gives greater resistance to breakage under flexion and better torsional capacity, since there is a better distribution of force on the material. However, according to the present invention, other inclinations of the leading edges 24 are also possible, for example about 30° or 60° or other types of join.

In this way, it is possible to obtain much greater lengths than those normally obtainable. The join line 22 between one strip 10 and the other is practically invisible, since it is made alternate and distributed along the strip and not at single different points.

Both the strip 10, and the stave, plank or strip obtainable by joining several sheets 14 head-wise have great elasticity, which cannot be found in products obtainable in the state of the art.

Figure 5A:
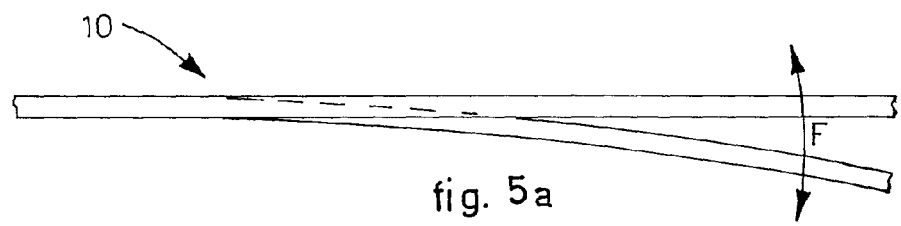
FIGS. 5a and 5b are three-dimensional views in different conditions of deformation of the wood-based product in FIG. 3.

In particular, they have great flexibility, as can be seen for example in FIG. 5a, with respect to transverse flexion moments acting in a direction perpendicular to the plane of the "glue lines" defined by the various layers of glue 16.

Figure 5B:
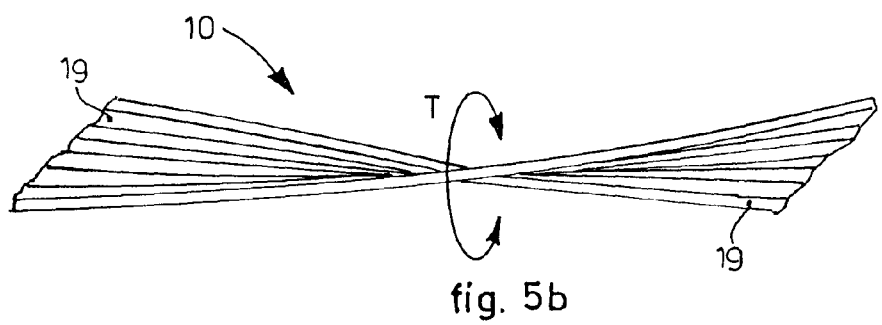

Moreover, with the present invention we obtain great torsional capacity with respect to torsional moments acting around the longitudinal axis, allowing great elastic deformations as can be seen for example in FIG. 5b.

Figure 6:
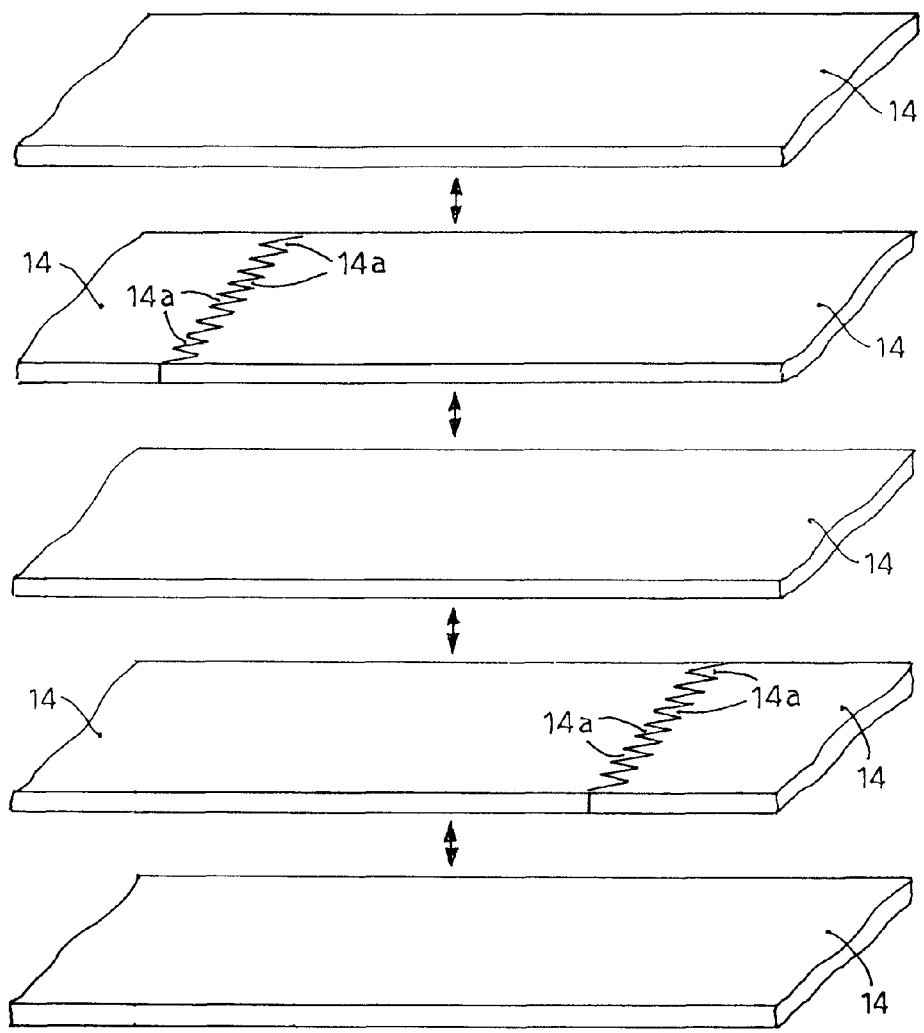
FIG. 6 is a variant embodiment of the present invention.

A variant embodiment of the present invention, shown in FIG. 6, provides that as an alternative to the coupling at 45° shown in FIG. 4a, the sheets 14 have coupling heads with a zigzag shaped profile 14a, or with protruding teeth, to define a so-called "finger joint" coupling between the different sheets 14, which variant is also advantageous for the purposes of the mechanical and elastic properties of the final product.

EXPERIMENTAL TESTS

We shall now describe a comparison between the adhesive SIKASIL WT-485® and a bi-component polyurethane adhesive product SikaForce-7710 L35 available commercially, both used to make a product according to the present invention.

In particular, comparative tests were carried out to determine the resistance to traction perpendicular to the wood fiber and to determine resistance to shearing parallel to the wood fiber for glued lamellar wood. This was to identify and prove the advantageous and surprising results deriving from the choice of a bi-component silicone elastomer adhesive compared with other commonly used adhesives, such as for example polyurethane based.

Other adhesives, such as melamine resins as used in EP'655, were discarded, since they are extremely rigid and not suitable for the purposes of the present invention.

SIKASIL WT-485® has the following technical characteristics:

| Product | Component A: Sikasil® WT-485 A | Component B: Sikasil® WT-485 B |
|---|---|---|
| Chemical characteristics | bi-component silicone | |
| Color | Beige | Brown |
| Mixed color | Beige | |
| Reticulation mechanism | Polycondensation | |
| Density | 1.44 kg/1 approx. | 1.07 kg/1 approx. |
| Mixed density | 1.42 kg/1 approx. | |
| Mixing ratio | | |
| (volume) | 10.01 | |
| (weight) | 13.01 | |
| Viscosity | 1200 Pa*s approx. | 110 Pa*s approx. |
| Consistency | paste | |
| Application temperature | 5-40° C. | |
| Start of reaction time | 10 min. approx. | |
| Pot life | 35 min. approx. | |
| Hardness Shore A | 45 approx. | |
| Resistance to traction | 2.3 N/mm$^2$ approx. | |
| Elongation at breaking point | 240% approx. | |
| Long term thermal | | |
| resistance | 180° C. | |
| 4 hours | 190° C. | |
| 1 hour | 240° C. | |
| Service temperature | from −40° C. to 150° C. | |
| Preservation | 12 months | |

Tests carried out at +23° C. and 50% r.h.

SikaForce-7710 L35 is the base of a bi-component polyurethane adhesive used with SikaForce-771 as a hardener. Its characteristics are:

| Product | Component A: SikaForce-7710 L35 | Component B: SikaForce-7710 |
|---|---|---|
| Chemical characteristics | Polyhydric alcohols | isocyanides |
| Color | Beige | Brown |
| Mixed color | Beige | |
| Reticulation mechanism | Polyaddition | |
| Density | 1.6 g/cm$^3$ approx. | 1.2 g/cm$^3$ approx. |
| Mixed density | 1.5 g/cm$^3$ approx. | |
| Mixing ratio | | |
| (volume) | 100 | 25 |
| (weight) | 100 | 19 |
| Viscosity | 30000 mPa*s approx. | 250 mPa*s approx. |
| Mixed viscosity | 10000 mPa*s approx. | |
| Pot life | 35 min. approx. | |
| Application temperature | 15-30° C. | |
| Hardness Shore D | 80 D approx. | |
| Resistance to traction | 11 N/mm$^2$ approx. | |
| Elongation at breaking point | 9% approx. | |
| Resistance to shearing | 9 N/mm$^2$ approx. | |
| Preservation (1000 lt.) | 6 months | |
| Preservation (<100 lt.) | 12 months | |

Tests carried out at +23° C. and 50% r.h.

Preparation of the Samples

The first step concerns the preparation of the teak veneer: when the material had reached the sizes requested, that is, with a thickness of 1.8 mm, it was taken to 1.6 mm by a calibration machine. The operation has a double purpose: first of all to open the pores of the wood so as to make it more penetrable to the adhesive, and secondly to reach the ideal thickness to obtain the best possible physical characteristics. Once out of the calibration machine the veneer passes under a series of nozzles emitting compressed air so as to render the surface clean and dry. After the wood had been prepared, the adhesives were prepared: since they are bi-components, a precision balance was used (Sartorius Mechatronics Combics EX) for weighing and a whip drill (DeWALT D21520) for mixing. All the operations were carried out in optimum environmental conditions for the reticulation of both products (temperature 22° C.). Naturally, since the mixing ratio and the pressure to be applied were different, the samples were prepared separately.

The bi-component silicone has a ratio A:B of 13:1, and a pot life after having made the two components react of about 35 minutes; this factor is influenced by the temperature of the surrounding environment. When ready, the silicone was laid using a pressure roller, calculating a consumption of 200 g/m$^2$, giving two layers of adhesive and applying a new sheet on top.

Since the final length was one of the main objectives fixed for this study, that is, wanting to produce an article having sizes that cannot be obtained traditionally, cuts were made at 45° on numerous sheets of veneer and then joined head-wise. To prevent accumulation of residual tensions, the joins were positioned so as not to overlap. The intention was to transfer a natural limit to a technological one: in this way the length of the final product depends exclusively on the productive capacity of the machine (sizes of the gluing machine and the press).

Once a sandwich of 40 sheets had been obtained, the article was put in the press, where it remained for 3 hours. Once out of the press, the new compound was left to rest for 24 hours before being trimmed by a circular saw (Altendorf WA 8).

With regard to the production of samples with bi-component polyurethane, the same operations were carried out, but the parameters were modified according to the chemical characteristics of the material.

In this case the mixing ratio A:B was 100:19; the quantity of product per m$^2$ was 150 g.

The only difference was in how the adhesive was deposited: since polyurethane is much more viscous than silicone, first of all a line of product was deposited by means of an extruder on the surface to be glued, and then this was spread manually with a spatula.

Sizing of the Samples

The samples for the tests were sized rationalizing to the utmost the material available, so as to be able to perform significant tests and at the same time to obtain a sufficient number of samples to construct a case record.

With regard to the samples intended for the mechanical tests, the indications of norm UNI EN 408 were followed, which describes the methodology used to determine the resistance to traction perpendicular to the wood fiber and to determine resistance to shearing parallel to the wood fiber for glued lamellar wood.

With regard to the heat conditioning, the tests were done according to the sizes of the sample-holders of the apparatus used.

Characterization Instruments and Methods

Mechanical tests were carried out on the materials to assess the resistance of the glue after exposure to cycles of artificial ageing.

Thermal analyses were also carried out, with the purpose of comparing the variations in size of the lamellar samples with the solid material.

The analyses carried out for the characterization were: resistance to traction, shearing force resistance and dilatometry.

Artificial Ageing Tests

Since the final product is intended for the decks of boats, the criteria adopted for the simulation of ageing were extremely rigid.

The destructive factors to be considered, especially with regard to adhesives, are:
- exposure to sunlight;
- extremely damp atmosphere (with the addition of salt—NaCl);
- large quantities of water due to the swimming pools and cleaning of the deck (in smaller boats the direct effect of sea water must be considered);
- extremes of temperature (e.g. the destinations of cruise ships).

Since there is no ageing test laid down in the regulations able to take into consideration all these factors, the following cycle was created, and was repeated 10 times, for a total of 720 hours:

| duration | conditioning | parameters |
| --- | --- | --- |
| 24 h | cataplasm | 70° C. 100% relative humidity |
| 16 h | immersion in water and salt | Ambient temperature |
| 8 h | UV lamp | 0.77 W/m$^2$ |
| 24 h | freezing | −28° C. |

By cataplasm we mean a type of conditioning that occurs in a heated container inside which there is a tank of water.

From a visual analysis, it was clear that the samples of lamellar wood with the bi-component polyurethane suffered more from the effect caused by the ageing cycle, since multiple cracks were found on the gluing line, whereas the samples with the bi-component silicone base did not suffer the effects due to ageing, and remained perfectly whole.

Instruments and Methods for Mechanical Characterization

Both tests for mechanical characterization (traction and shearing) were carried out with the same apparatus, a universal test machine Shimadzu Autograph AG-A.

Description of the Traction Test

The test consisted of subjecting a determinate sample to static stress applied in the baricenter of the section of material and acting in the direction of the axis of the body: the stress was increased slowly and gradually until the sample was completely broken.

The machine used for the traction test consisted of a frame, the device to apply the load, the members to attach the sample or element and the instruments to measure the force. The machines usually used for traction tests on metals can apply loads from 1000 kg to 40,000 kg; they are classified according to the load they can apply to the material.

Machines used for the traction test of 2000 kg and more are mainly constructed as universal test machines. Portable machines do exist, but these exert only minimal force (up to 1 kg), whereas the large majority, including the already cited light machines (from 1 kg up) have a vertical axis and therefore support a larger load. In these machines, because of the base, the weight is often double that of the maximum traction force; only in machines used for the traction test at 100 kg and more does the traction force exceed by about 20 times the weight of the machine. The energy to produce the force in the test machine is provided by a high-pressure pump coupled with an electric motor; by varying the travel of the pump or the number of travels per minute, it is possible to obtain an almost continuous regulation within large limits of the delivery of oil and hence the speed of application of the load. A universal hydraulic machine consists of a frame comprising: a base, two supporting columns, a fixed cross-piece, two uprights, a work cross-piece.

In the case of a traction test, the machine functions as follows. The test tube is attached to the jaw connected to the basement and the jaw connected to the work cross-piece. The hydraulic system allows to displace the cross-piece, which draws with it the connected jaw and exerts stress on the test tube.

The software that manages the functioning of the apparatus allows to display immediately the progress of the test by means of a graph, and at the end supplies a table with the values recorded during the test.

Methods for the Traction and Shearing Test

The positioning and clamping of the samples by means of the two jaws must be carried out with extreme care for two reasons:
- during the test, the force applied must be distributed uniformly over the whole sample;
- since they are lamellar wood samples, during the clamping operation of the jaws, it is necessary to prevent the creation of trigger points which would risk invalidating the final result of the test.

The speed of movement of the cross-piece was fixed at 5 mm/min both for the resistance to traction test and also for the resistance to shearing by traction test.

For the resistance to shearing test the same methods were used.

Instruments and Methods for the Heat Analyses

To determine the dilatation coefficient the Heating Dilatometric Microscope (HDM) (Expert System Solutions) was used.

Dilatometer

The functioning principle is based on two high-enlargement microscopic optics that frame both ends of the sample. The resolution of the optical system can reach the limit value of 0.5 µm, by using a blue light source at 478 nm. The two optical paths are completely protected and the whole optical unit is enclosed inside a shield that is moved by a micrometric slider so as to allow focusing. The sample, with a maximum length of 50 mm, is supported inside the oven by two rods on which the sample examined can be directly positioned.

The two ends of the sample are illuminated by two beams of blue light with a wavelength of 478 nm, which allows to reach the optical resolution of 0.5 µm per pixel.

Methods

The environmental factors described above are not only considered destructive agents but also cause movements that characterize the wood that makes up the decks. However, in the "traditional" system, these movements are balanced by the polyurethane rubber that surrounds every single stave, thus sealing the deck.

The purpose of this test was to assess the heat expansion of the samples of lamellar wood and to compare them with those relating to samples of solid wood.

In order to obtain a reliable result, the positioning of the sample and the subsequent focusing must be carried out with extreme accuracy.

The cycle adopted was as follows:

| initial temperature | increase ΔT/min | Final temperature |
| --- | --- | --- |
| Ambient Temperature | 5° C./min | 70° C. |

Artificial Ageing on Samples of Bi-Component Silicone

On samples of lamellar wood with bi-component silicone, a further test of artificial ageing was carried out.

The purpose of the test was to assess changes in the color of the wood and the possible change of color of the silicone.

Instruments

The apparatus used was the Q-Sun Xenon Test XE-1-S, which simulates artificial ageing by means of a Xenon lamp and a spray system.

For this test we prepared 14 samples sized 50 mm×105 mm×5 mm (Length×Height×Depth).

To assess the change in color we used the image processing software ImageJ.

Methods

The samples were conditioned according to norm ASTM G 155, fixing the following conditions, with an irradiance of 0.35 W/m2 and wavelength of 340 nm:

| conditioning | temperature | duration |
| --- | --- | --- |
| irradiance | 63° C. (±2° C.) | 102 min |
| irradiance + water(spray) | 21° C. | 18 min |

The first sample was removed from the apparatus after 240 hours of exposure to the cycle and the other samples were removed every 120 hours.

The assessment of the variation in color was carried out according to 3 different methods:

assessment of the displacement of the color curve in the scale of grays analysis of the color curve in the RGB scale objectification of the color change (resin and wood) by means of analysis on the scale of grays.

Results

The characterization was carried out from the perspective of:

comparing the mechanical resistance of the samples before and after the artificial ageing;

determining the heat dilatation of the samples before and after the artificial ageing and comparing it with that of solid wood.

The analyses carried out for characterization were resistance to traction force, resistance to shearing force by traction and dilatometry.

All the tests were of the comparative type, that is, we compared the results obtained from lamellar samples with bi-component silicone according to the present invention and bi-component polyurethane, both aged and not aged and, in the case of dilatometry, also solid wood samples.

In the case of samples subjected to the conditioning cycle, from a first visual analysis it was seen that some glue lines in the samples with the bi-component polyurethane base suffered the effects due to artificial ageing, with obvious delaminations (and therefore lack of adhesion), whereas the samples with the bi-component silicone base were perfectly whole.

If we compare the results of the heat analyses carried out, we see that the effects of the conditioning cycle moderately increased expansion in the samples of bi-component silicone, whereas the values for the bi-component polyurethane increased significantly.

Analyzing together the mechanical and dilatometric data, we see that the bi-component silicone was not affected by the conditioning cycle, and its adhesive capacities remained unchanged. In the case of polyurethane, on the contrary, the effects due to ageing changed the adhesive properties.

Bi-component polyurethane is therefore less reliable than bi-component silicone: the delaminations observed after conditioning (which represents a simulation of the final use) does not guarantee a safe use. For this reason the conditioning tests and color analysis were carried out on samples with bi-component silicone, at the end of which the silicone showed no signs of delamination or color change.

After these exhaustive experimental tests, Applicant therefore selected, as elastomer adhesive, a bi-component silicone based adhesive which has advantageous and surprising effects on the final product with regard to flexibility and torsional capacity, heat and mechanical resistance, both in the case of a non-conditioned product, and also in the case of ageing, unlike other adhesives available, such as melamine resins, excessively rigid, or polyurethane based adhesives as compared above.

It is clear that modifications and/or additions of parts and/or steps may be made to the method to produce a wood-based product and the product 10 thus produced as described heretofore, without departing from the field and scope of the present invention. It is also clear that, although the present invention has been described with reference to some specific examples, a person of skill in the art shall certainly be able to achieve many other equivalent forms of method to produce a wood-based product (mixed or other materials) and the product thus produced, having the characteristics as set forth in the claims and hence all coming within the field of protection defined thereby.

The invention claimed is:

1. Method to produce a flexible wood-based product (10), comprising a first step in which, from a trunk (12) of wood, a plurality of sheets of wood (14) are made, a second step in which a stack or pile (15) formed by the sheets (14) disposed one on top of the other is made, and in which, between one sheet (14) and the other, a layer of adhesive material (16) is deposited, along determinate gluing planes (P), a third step in which the stack or pile (15) is subjected to compression for a determinate period of time at a temperature between about 5° C. and 40° C., so as to allow the reticulation of the adhesive material and to make the sheets (14) adhere permanently to each other, and a fourth step in which the stack or pile (15) is cut along at least a plane transverse to said gluing planes (P), in order to obtain the flexible product (10), wherein, between the first and the second step, a head-wise joint is formed between one sheet (14) and another, by means of said adhesive material (16), in correspondence with relative head and tail edges (24) of juxtaposed sheets (14) and, in the course of the third step, the head-wise joined sheets (14) are stacked one above the other, so that the corresponding joined edges (24) are offset laterally along the thickness of the stack or pile (15) that is formed, so as to obtain a final element of desired sizes.

2. Method as in claim 1, characterized in that the thickness of each sheet (14) made in the first step is less than about 3 mm.

3. Method as in claim 1, characterized in that the temperature at which compression occurs in the third step is comprised between about 20° C. and 30° C.

4. Method as in claim 1, characterized in that the temperature at which compression occurs in the third step is comprised between about 20° C. and 25° C.

5. Method as in claim 1, characterized in that the wood used is teak.

6. Method as in claim 1, characterized in that the leading edges (24) and tail edges of the sheets (14) that are joined have a zigzag shaped profile (14a) with protruding teeth so as to define a "finger joint" coupling.

7. Method as in claim 1, characterized in that the head and tail edges (24) of the sheets (14) that are joined are shaped inclined in a manner mating with each other.

8. Method as in claim 7, characterized in that the angle of inclination of the edges (24) is comprised between about 40° and about 50°.

9. Method as in claim 1 or 2, characterized in that the adhesive material is a bi-component silicone formed by two silicone based components, of which a first component A having an approximate density comprised between about 1.40 and 1.50 kg/l, and a second component B having an approximate density comprised between 1.00 and 1.10 kg/l.

10. Method as in claim 9, characterized in that the bi-component silicone is formed by a first component A and a second component B having a mixing ratio A:B comprised between 10:1 and 15:1.

11. Method as in claim 9, characterized in that the bi-component silicone used has a mixed density comprised between 1.20 kg/l and 1.48 kg/l.

12. Method as in claim 9, characterized in that the bi-component silicone is formed by two silicone based components, of which a first component A having an approximate viscosity comprised between about 1100 Pa*s and 1300 Pa*s, and a second component B having an approximate viscosity comprised between 100 Pa*s and 120 Pa*s.

13. Method as in claim 9, characterized in that the bi-component silicone used has a Shore hardness A between 40 and 50.

14. Method as in claim 9, characterized in that the bi-component silicone used has an elongation at breaking point comprised between 220% and 260%.

15. Method as in claim 9, characterized in that the bi-component silicone used has a resistance to traction comprised between 2 N/mm$^2$ and 2.5 N/mm$^2$.

* * * * *